United States Patent [19]

Hicks

[11] 4,194,586
[45] Mar. 25, 1980

[54] GEARED TORQUE SELECTOR

[75] Inventor: Bradford W. Hicks, Mentor, Ohio

[73] Assignee: Eaton Corporation, Cleveland, Ohio

[21] Appl. No.: 906,979

[22] Filed: May 17, 1978

[51] Int. Cl.² .................... F16H 37/08; B16K 17/16
[52] U.S. Cl. ................................. 180/24.09; 74/700
[58] Field of Search ............... 180/24.09, 44 R, 49; 74/700, 701, 369, 745

[56] References Cited

U.S. PATENT DOCUMENTS

| | | | |
|---|---|---|---|
| 1,689,377 | 10/1928 | Austin | 74/366 |
| 1,983,955 | 12/1934 | Fraunhofen | 74/700 |
| 2,791,912 | 5/1957 | Bixby | 74/344 |
| 2,831,372 | 4/1958 | Boughner | 74/700 |
| 3,000,456 | 9/1961 | Christie | 180/24.09 |
| 3,146,842 | 9/1964 | Nelson | 180/24.09 |
| 3,611,832 | 10/1971 | Vollmer | 74/700 |
| 3,645,153 | 2/1972 | Northcraft | 74/700 |
| 3,941,199 | 3/1976 | Williams | 180/44 R |
| 4,050,534 | 9/1977 | Nelson | 180/24.09 |

Primary Examiner—Joseph F. Peters, Jr.
Assistant Examiner—Randall A. Schrecengost
Attorney, Agent, or Firm—R. J. McCloskey; H. D. Gordon

[57] ABSTRACT

An auxiliary transmission unit is connected to the input of a power divider, which power divider is connected between a pair of pinion shafts for respectively driving the front and rear axles of a tandem axle construction. The power divider includes at least one pair of meshing axle gears drivingly interconnected between the pinion shafts for transmitting torque to each of the axles. The auxiliary transmission unit includes a single pair of meshing transmission gears, one thereof being associated with the transmission input shaft and the other being associated with a parallel countershaft. The output of the transmission unit comprises one of the shafts of the power divider. A clutch sleeve is shiftably associated with the input shaft and can be engaged with the transmission output for permitting direct driving thereof, or it can alternately be shifted into a disengaged position whereby the input transmission gear drivingly rotates the countershaft to thereby provide a reduced speed ratio through the auxiliary transmission unit. The countershaft is drivingly connectable to one of the axle gears for driving the power divider when the auxiliary transmission is in its low speed condition.

11 Claims, 4 Drawing Figures

GEARED TORQUE SELECTOR

FIELD OF THE INVENTION

This invention relates to a geared drive system and, in particular, to an improved auxiliary transmission for a tandem drive axle construction.

BACKGROUND OF THE INVENTION

Tandem drive axles for use in heavy-duty vehicles such as trucks normally employ a gear-type power divider for transmitting driving torque to each of the drive axles. This power divider often includes an interaxle differential unit for providing a differential relationship between the two driving axles under normal operating conditions. Provision is also made to "lock out" this differential unit under conditions when the differential action would cause a loss of traction. The power divider is also conventionally provided with an auxiliary transmission unit at the input thereof to provide one or more additional gear ratios, and more specifically an additional low speed ratio which is desirably used during off-highway operations.

As illustrated in U.S. Pat. No. 3,611,832, it has been conventional to construct and operate the auxiliary transmission independently of the interaxle differential, with the auxiliary transmission being of substantially conventional construction wherein a pair of shafts are interconnected by several gear pairs. These known systems have operated in a satisfactory manner but, as is obvious to those familiar with this technology, there is a continuing effort to improve upon such geared systems. In particular, since geared systems of this type as applied to heavy-duty vehicles are large and mechanically complex, it is obviously desirable to simplify such systems, whenever possible, without detracting from the desired mode of operation. Any simplifications which reduce the number of components, the weight or size of the overall system, or which sufficiently simplify the system so as to hopefully reduce the required maintenance and repair, while at the same time retaining or improving upon the desired mode of operation, is thus a strongly pursued objective.

Accordingly, it is an object of the present invention to provide an improved geared drive system and, in particular, an improved auxiliary transmission for use with the power divider of a tandem axle construction.

Another object of this invention is to provide an improved auxiliary transmission, as aforesaid, for use with a power divider which may include an interaxle differential, with the auxiliary transmission being of simplified structure and reduced size while at the same time providing the power divider with the desired speed ratios.

Still another object of the invention is to provide an improved auxiliary transmission for use with an interaxle power divider, as aforesaid, wherein the auxiliary transmission permits the power divider to be operated at two different speed ratios while at the same time the auxiliary transmission possesses only a single pair of meshing gears, whereby the size and structure of the auxiliary transmission and particularly the number of gears is greatly reduced.

A further object is to provide an auxiliary transmission, as aforesaid, which utilizes a pair of gears associated with the power divider to permit accomplishment of the desired low speed ratio which is achieved through use of the auxiliary transmission, whereby said pair of gears perform a dual function in that they comprise an essential part of both the power divider and the auxiliary transmission.

The objects and purposes of this invention, including those mentioned above, have been met by connecting an auxiliary transmission unit to the input of a power divider, which power divider is connected between a pair of pinion shafts for respectively driving the front and rear axles of a tandem axle construction. The power divider includes at least one pair of meshing axle gears drivingly interconnected between the pinion shafts for transmitting torque to each of the axles. The auxiliary transmission unit includes a single pair of meshing transmission gears, one thereof being associated with the transmission input shaft and the other being associated with a parallel countershaft. The output of the transmission unit comprises one of the shafts of the power divider. A clutch sleeve is shiftably associated with the input shaft and can be engaged with the transmission output for permitting direct driving thereof, or it can alternately be shifted into a disengaged position whereby the input transmission gear drivingly rotates the countershaft to thereby provide a reduced speed ratio through the auxiliary transmission unit. The countershaft is drivingly connectable to one of the axle gears for driving the power divider when the auxiliary transmission is in its low speed condition.

Other objects and advantages of the invention will be apparent to persons familiar with systems of this type upon reading the following specification and inspecting the accompanying drawings.

Figure 1:
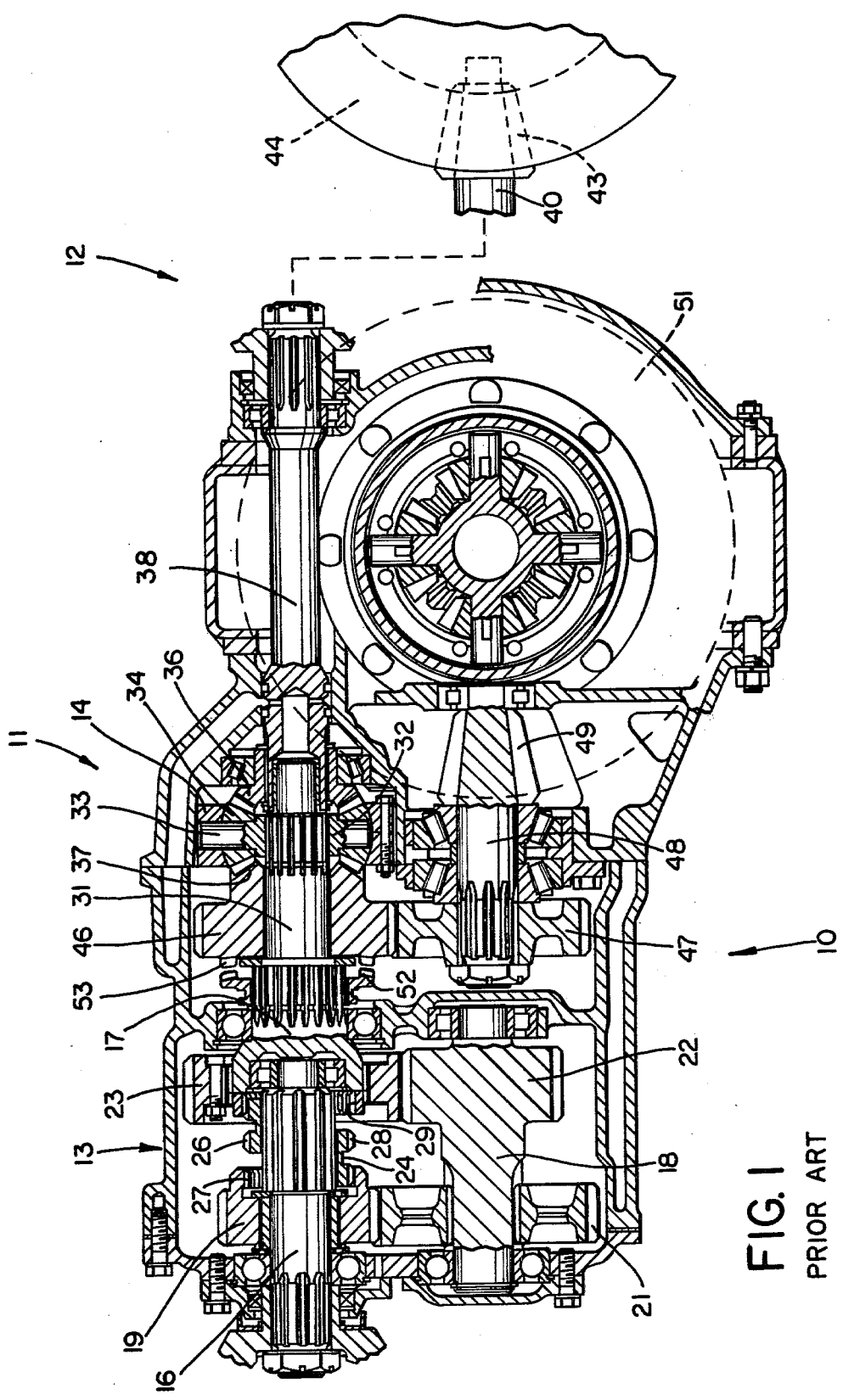
FIG. 1 is a central sectional view of a conventional geared drive system wherein an auxiliary transmission is connected to the input of an interaxle power divider.

Certain terminology will be used in the following description for convenience in reference only and will not be limiting. For example, the words "upwardly", "downwardly", "leftwardly" and "rightwardly" will refer to directions in the drawings to which reference is made. The word "front" will be used with reference to the end of components or assemblies which are disposed more closely adjacent the front end of the vehicle, the "front" normally being disposed leftwardly in FIGS. 1 and 2. The words "inwardly" and "outwardly" will refer to directions toward and away from, respectively, the geometric center of the apparatus and designated parts thereof. Said terminology will include the words specifically mentioned, derivatives thereof and words of similar import.

DETAILED DESCRIPTION

FIG. 1 illustrates a geared drive mechanism 10 which includes a power divider 11 for driving a tandem axle combination 12. Power is transmitted to the power divider 11 through an auxiliary transmission 13 which gives multispeed capability to the drive axles. The power divider 11, in the illustrated embodiment, includes an interaxle differential unit 14.

The auxiliary transmission 13 includes a rotatable input shaft 16, an intermediate shaft 17 coaxially aligned with the input shaft, and a parallel countershaft 18. An input gear 19 is rotatably supported on the input shaft and is disposed in continuous meshing engagement with a first intermediate gear 21 which is fixed to the countershaft 18. A second intermediate gear 22 is also fixed to the countershaft 18 and is disposed in continuous meshing engagement with an output gear 23 which is concentric with and nonrotatably connected to the forward end of the intermediate shaft 17.

A toothed clutch sleeve 24 is slidably supported on the input shaft 16, as by being axially splined thereto, and is axially movable between the input gear 19 and the output gear 23 for clutchable engagement therewith. For this purpose, the clutch sleeve 24 has an annular toothed section 26 at the leftward axial end thereof adapted for meshing engagement with a complimentary annular toothed section 27 formed on the input gear 19. The rightward end of clutch sleeve 24 has a further annular tooth section 28 which is adapted to be meshingly engaged with a complimentary annular tooth section 29 which is nonrotatably associated with the intermediate shaft 17.

The intermediate shaft 17, which functions as the input to the power divider, includes a shaft section 31 having a conventional differential spider 32 nonrotatably connected thereto, which spider includes a plurality of radially projecting arms 33 on which are rotatably supported conventional differential bevel gears 34. These latter gears are disposed in meshing engagement with bevel-type annular side gears 36 and 37 which are disposed on opposite sides of the differential spider in concentric relationship to the shaft section 31.

The side gear 36 is nonrotatably connected to the leftward end of output shaft 38, which shaft is coaxially aligned with the shaft section 31. Shaft 38 is drivingly interconnected to the pinion shaft 40 having a first bevel drive pinion 43 thereon, which pinion is disposed in meshing engagement with a first ring gear 44 as associated with the rear axle. Shafts 38 and 40 are conventionally interconnected by an intermediate shaft having universal joints at opposite ends, or optionally by appropriate gearing.

The front side gear 37 is fixedly, here integrally, associated with a gear 46 which is rotatably supported on the shaft 17. This gear 46 is in continuous meshing engagement with a further gear 47 which is nonrotatably secured to a second pinion shaft 48 extending in parallel with the output shaft 38. A second bevel drive pinion 49 is nonrotatably secured on the pinion shaft 48 and is disposed in meshing engagement with a second ring gear 51 as associated with the front axle.

To permit the power divider 11 to be locked up and thereby prevent any differential movement between the pinion shafts 40 and 48, a toothed clutch collar 52 is nonrotatably but axially shiftably mounted on the shaft 17 and is adapted to be moved into engagement with a set of annular clutch teeth 53 which project from the front face of the gear 46, whereby the gear 46 can be nonrotatably locked to the intermediate shaft 17, which in turn causes the power divider 11 to lock up so that pinion shafts 40 and 48 are synchronously rotated.

The geared drive mechanism 10 is well known, and reference is made to the above-mentioned U.S. Pat. No. 3,611,832 for additional description thereof. In operation, this conventional system 10 has input torque transmitted from the engine through the main transmission to the input shaft 16 of the auxiliary transmission 13. Under normal operating conditions, the clutch sleeve 24 is maintained in its rearwardmost position (as shown on the top side of FIG. 1) wherein the input and intermediate shafts 16 and 17 are directly drivingly connected, whereby the auxiliary transmission 13 is bypassed. The intermediate shaft 17 drives the differential spider 32 so that bevel gears 34 react against the side gears 36 and 37, thereby causing driving of the pinion shafts 40 and 48. In the event that differential movement is required between the front and rear axles, then this is compensated for due to the differential movement permitted by the differential unit 14. When a very low speed ratio is desired, such as for off-highway use, then clutch 24 is shifted forwardly (leftwardly) into the position shown on the bottom of FIG. 1 so that clutch sleeve 24 disengages the intermediate shaft 17 and engages the input gear 19. Torque is then transmitted from input shaft 16 to input gear 19, and thence through intermediate gears 21-22 to the output gear 23, which drives the shaft 17 at a reduced speed ratio. Under this condition, the interaxle differential is fully operative to permit differential movement between the pinion shafts 40 and 48. If necessary or desired, clutch sleeve 52 can be shifted into engagement with teeth 53 to nonrotatably connect gear 46 to shaft section 31, thereby causing the differential 14 to lock up and hence prevent any differential movement between the pinion shafts 40 and 48.

Figure 2:
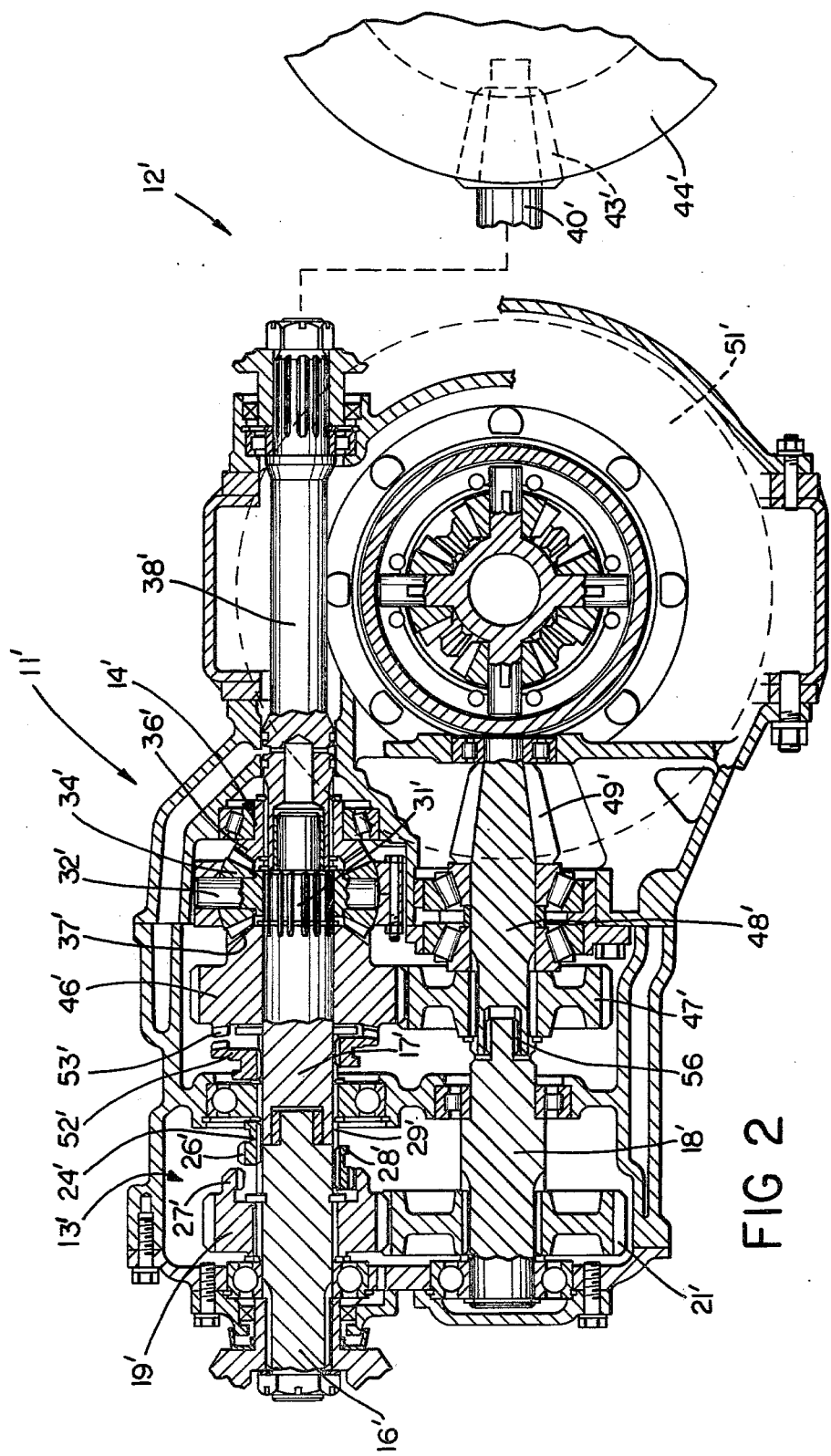
FIG. 2 is a central sectional view similar to FIG. 1 and illustrating a geared drive system incorporating therein the improved auxiliary transmission of the present invention.
Figure 3:
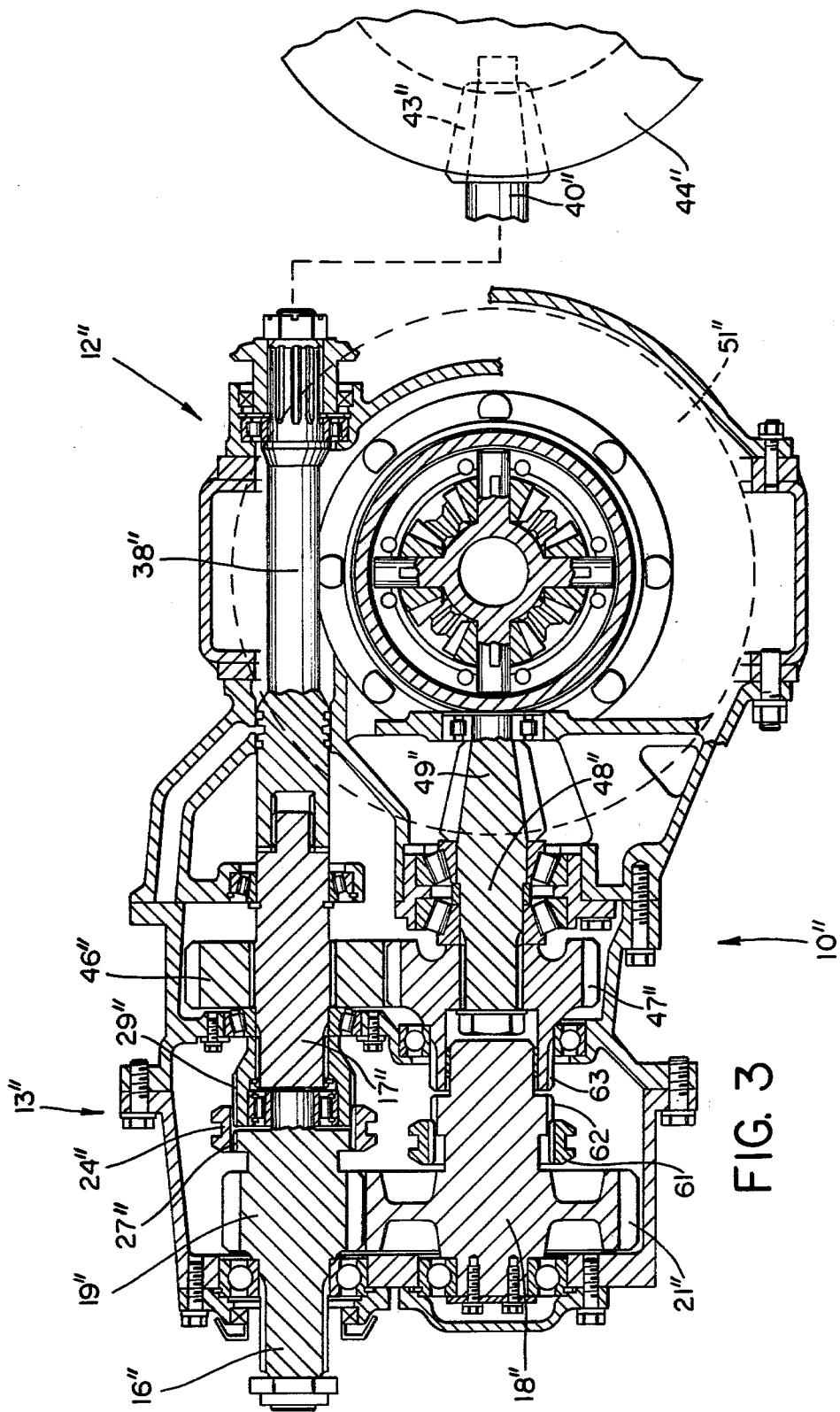
FIG. 3 is a central sectional view similar to FIG. 1 but illustrating another variation of the present invention.

While the geared drive mechanism 10 illustrated in FIG. 1 has proven highly desirable for use on heavy-duty vehicles such as trucks and the like, nevertheless the present invention as illustrated in FIGS. 2 and 3 is believed to represent a significant improvement thereover by permitting a substantial simplification in the overall geared drive mechanism, which simplification reduces the number of gears to thus minimize cost, weight, complexity and maintenance. This simplification also permits a substantial reduction in size, and particularly length, of the geared drive mechanism.

Referring to FIG. 2, same illustrates a geared drive mechanism 10' according to the present invention, wherein parts thereof have been identified by the same reference numerals utilized to identify corresponding parts in FIG. 1 but with the addition of a prime (') thereto.

The mechanism 10' again includes a power divider 11' for supplying torque to the two axles associated with the tandem axle combination 12'. The power divider 11', and the associated interaxle differential 14', are identical to the structures illustrated in FIG. 1.

Considering now the auxiliary transmission 13', same includes an input gear 19', freely rotatably supported on the input shaft 16' and disposed in continuous meshing engagement with an intermediate gear 21', the latter being nonrotatably secured to the countershaft 18'. The countershaft 18' is in turn directly nonrotatably connected to the differential pinion shaft 48', as by being either integral therewith or by being nonrotatably connected thereto by use of any conventional structure, such as by a splined connection 56. The input and intermediate shafts 16' and 17', respectively, can be directly drivingly connected by a shiftable clutch sleeve 24' which is axially slidably splined on the input shaft 16' and can be shifted axially rearwardly (rightwardly) for engagement with splines 29' formed on the front end of the intermediate shaft 17'. This sleeve 24' can also be shifted frontwardly (leftwardly) so that the annular toothed section 26' meshingly engages the cooperating toothed section 27' formed on the input gear 19'. In this latter position, the intermediate shaft 17' is disengaged from the clutch sleeve and the latter directly couples the input gear 19' to the input shaft 16'.

In operation, the clutch sleeve 24' is normally maintained in its rearward position as shown in the top part of FIG. 2 so that shafts 16' and 17' are directly coupled together in a one-to-one driving relationship. Under this condition, the input gear 19' is free to rotate relative to the input shaft 16'. The intermediate shaft 17' thus drives the power divider 11' in a conventional manner, which in turn drives the pinion shafts 40' and 48' while permitting relative rotation therebetween due to the presence of the differential 14'.

If it should be desirable to provide a lower speed ratio for the drive axles, such as for off-highway use, then the clutch sleeve 24' is shifted forwardly (leftwardly) into the position shown in the lower part of FIG. 2. This results in intermediate shaft 17' being disengaged from direct connection to the input shaft 16', and also results in the input gear 19' being nonrotatably coupled to the input shaft 16'. Substantially simultaneously therewith, the lockup clutch sleeve 52' associated with the power divider is shifted rearwardly into meshing engagement with the teeth 53' formed on gear 46', as shown in the lower part of FIG. 2, so that the gear 46' is nonrotatably connected to the shaft 17'. This results in the power divider 11' being locked up whereby relative movement between the pinion shafts 40' and 48' is not permitted. Thus, driving torque from input shaft 16' is transmitted from input gear 19' through intermediate gear 21' to countershaft 18', which in turn directly drives the pinion shaft 48'. The gear 47' on this latter shaft in turn drives the gear 46', which in turn directly drives the other pinion shaft 40'. Since the gear pair 46'-47' provides a one-to-one speed ratio, the pinion shafts 40' and 48' are thus simultaneously and synchronously driven, although no relative movement is possible therebetween inasmuch as the power divider 11' must be maintained in a locked condition when the auxiliary transmission 13' is shifted into its low speed condition.

Thus, in the present invention, the auxiliary transmission 13' has the countershaft 18' directly drivingly connected to the pinion shaft 48', and additionally utilizes the lockup clutch 52' of the power divider to permit the overall gear mechanism 10' to be shifted into a desired low speed condition. By incorporating these latter modifications and adaptations, the auxiliary transmission 13' thus requires only a single pair of meshing gears. In contrast, the prior auxiliary transmission 13 as shown in FIG. 1 utilizes two pairs of meshing gears to provide the same low speed condition. The second pair of gears 22-23 has been eliminated in the auxiliary transmission 13' of the present invention, which thereby not only reduces the structural and operational complexity of the overall mechanism, but also permits minimization in the size and weight thereof. While the gear mechanism 10' must necessarily lock up the power divider 11' in order to operate in the low speed condition provided by the auxiliary transmission 13', nevertheless this is of little consequence inasmuch as this condition is used only for low-speed off-highway operation. Under such conditions, any tire scrubbing is extremely small and creates no significant wear or damage.

Referring now to FIG. 3, there is illustrated a preferred embodiment of the invention wherein corresponding parts have again been identified by the same reference numerals utilized in FIGS. 1 and 2 but with the addition of a double prime (") thereto.

The geared drive mechanism 10" of FIG. 3 includes a power divider 11" for driving the tandem axle combination 12", with power being transmitted to the power divider 11" through the auxiliary transmission 13". In this embodiment, the power divider 11" again includes a pair of meshing gears 46"-47" which drive output shaft 48" for driving the front axle. This power divider 11" does not, however, include an interaxle differential.

The auxiliary transmission 13" is similar to the transmission 13' of FIG. 2 in that it has an input gear 19" which is fixed, here integrally, to the input shaft 16". This input gear 19" is in continuous meshing engagement with an intermediate gear 21" which is nonrotatably associated with the countershaft 18".

Input shaft 16" and input gear 19" are coaxially aligned with the intermediate shaft 17", and the adjacent ends of the shafts 16" and 17" respectively have external splines or teeth 27" and 29" thereon. A conventional internally splined clutch sleeve 24" is meshingly engaged and axially slidably supported on the teeth 29" and can be shifted from a rightward disengaged position (as shown) into a leftward position of engagement with the teeth 27" to directly drivingly connect the shafts 16" and 17".

The countershaft 18" also has a splined tooth construction 62 on which is axially slidably supported a conventional clutch sleeve 61. A further set of splines or teeth 63 are formed on the adjacent end of the gear 47". The clutch sleeve 61 can be shifted from its leftward nonengaged position (as shown) into a rightward position wherein it engages teeth 63 to thereby directly drivingly connect the countershaft 18" to the gear 47", which in turn is directly drivingly coupled to the pinion shaft 48".

During normal operation, the clutch sleeves 24" and 61 are in the positions shown in FIG. 3, so that driving torque is transmitted from the main transmission through shaft 16" directly to shaft 17", which in turn drives the two axles. However, when a lower speed ratio is desired, as for off-highway use, then the clutch sleeves 24" and 61 are simultaneously shifted rearwardly (rightwardly in FIG. 3) so that clutch sleeve 24" disengages the teeth 27" and momentarily thereafter the clutch sleeve 61 engages the teeth 63. The driving torque is then transmitted from shaft 16" through gear pair 19"-21" to countershaft 18", which in turn directly drives the gear 47" and pinion shaft 48". The rear axle is in turn driven from the gear 47" through the gear pair 47"-46", and thence through the output shaft 38".

While the embodiment of FIG. 3 illustrates the use of two separate clutch sleeves 24" and 61, it will be appreciated that this embodiment of the invention could accomplish the two clutch functions by use of a single clutch sleeve as illustrated by the auxiliary transmission 13' of FIG. 2. Conversely, the embodiment of FIG. 2 could utilize an auxiliary transmission having two separate clutch sleeves, as by utilizing the construction of the transmission 13" illustrated in FIG. 3.

Figure 4:
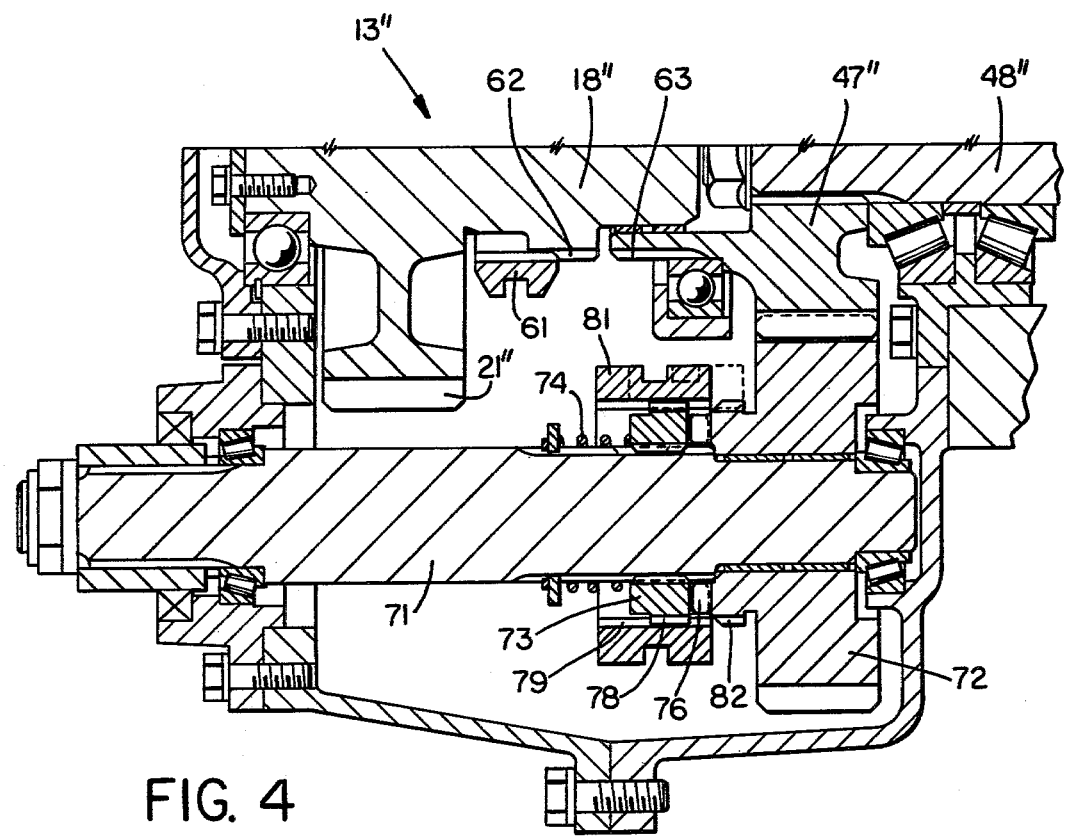
FIG. 4 is a fragmentary sectional view illustrating still a further variation of this invention.

FIG. 4 illustrates a further variation which can be added onto the geared drive mechanism of FIG. 3 (or FIG. 2) to permit this mechanism to be used with a vehicle having two rear drive axles and a front drive axle, commonly referred to as a 6 by 6. In this case, the auxiliary transmission 13" is provided with still a further countershaft 71 which is rotatably supported parallel to the countershaft 18". The shaft 71 projects forwardly and, in a conventional manner, can be drivingly interconnected to a front axle so as to transmit driving torque thereto. Countershaft 71 has a gear 72 rotatably supported thereon, which gear is in continuous meshing engagement with the gear 47". Gear 47" must have at least one less tooth than gear 72 so that gear 72 will rotate slower than gear 47" in the absence of a spin-out condition. An overrunning clutch collar 73 is splined to the shaft 71 and is urged by a spring 74 toward the gear 72, being normally nonrotatably engaged therewith by axially opposed interacting ramp-type teeth 76 and 77 as associated with collar 73 and gear 72, respectively.

The clutch collar 73 also has external teeth 78 which are slidably engaged with internal splines 79 formed on an axially shiftable clutch sleeve 81 which is in a disengaged position as illustrated. This clutch sleeve 81 can be shifted axially rearwardly (rightwardly) so that the internal splined teeth 79 thereon will meshingly engage with external teeth 82 formed on the gear 72. Clutch sleeve 81 is provided to permit a positive lockup between gear 72 and countershaft 71.

Under normal operating conditions, gear 47" and shaft 71 rotate at the same speed since all of the vehicle axles rotate at substantially the same speed. However, since gear 72 has at least one more tooth and hence rotates slower than the driving gear 47", the shaft 71 normally overruns the gear 72 as permitted by the overrunning clutch 73 therebetween. When the rear wheels slip or spin, so that the rear axle rotates faster than the front axle by a ratio greater than that provided between the gears 47" and 72, then gear 47" will rotatably drive the gear 72 and it in turn will rotatably drive the shaft 71 and its associated front axle through the clutch 73. The ratio between the gears 47" and 72 will, however, allow slight variation in the rear axle speed without causing a direct driving of the front axle.

As an additional modification, the rotational speed of shaft 17 and the front axle drive shaft 71 may be electronically monitored. If the rotational speed of shaft 17 exceeds the rotational speed of shaft 71 by greater than a predetermined amount (usually 100 RPM), the clutch 81 will be automatically shifted into an engaged or lockup condition (as by a solenoid or the like). The speed of shaft 17 may be monitored by providing teeth or slots in the interaxle differential case.

As illustrated in FIGS. 2 and 3, this invention permits an auxiliary transmission to be connected to the input of a power divider associated with a tandem axle construction, which power divider employs at least one meshing gear pair. By utilizing the meshing gear pair associated with the power divider, the auxiliary transmission of this invention uses only a single additional meshing gear pair so that an additional low speed ratio can be provided while at the same time minimizing the additional structural and spatial requirements of the overall geared drive mechanism. While FIGS. 2 and 3 illustrate two variations of the auxiliary transmission, it will be appreciated that the number and types of clutching relationships can assume many different forms. Further, either or both of these variations of auxiliary transmission can be utilized with a power divider which does or does not incorporate an interaxle differential.

Although a particular preferred embodiment of the invention has been disclosed for illustrative purposes, it will be recognized that variations or modifications of the disclosed apparatus, including the rearrangement of parts, lie within the scope of the present invention.

What is claimed is:
1. In a geared drive system for transmitting driving torque to a pair of drive axles, said system including:
   a power divider drivingly connected to said pair of drive axles for driving same, said power divider including driving shaft means, first and second output shafts disposed substantially parallel to said driving shaft means and each drivingly connected to a respective one of said drive axles, an axle gear set drivingly connected between said driving shaft means and said first output shaft, and means drivingly connecting said driving shaft means and said second output shaft;
   auxiliary transmission means connected to the input end of said power divider for driving same at a different speed ratio, said auxiliary transmission means including an input shaft and a substantially parallel countershaft, said input shaft being coaxially aligned with said driving shaft means, and said countershaft being coaxially aligned with said first output shaft;
   comprising the improvement wherein said auxiliary transmission means includes a single transmission gear set drivingly connectable between said input shaft and said countershaft, and clutch means having a first position of engagement for directly drivingly connecting said input shaft to said driving shaft means for permitting direct driving of said power divider, said clutch means having a second position of engagement which disconnects said input shaft from said driving shaft means and directly drivingly connects said countershaft to said first output shaft for driving said power divider at said different speed ratio.

2. A system according to claim 1, wherein said transmission gear set includes an input gear rotatably supported on said input shaft, and said clutch means including a clutch sleeve nonrotatably connected to and axially shiftably supported on said input shaft, said clutch sleeve when in said first position being disengaged from said input gear and nonrotatably connected to said driving shaft means, said clutch sleeve when in said second position being disengaged from said driving shaft means and nonrotatably coupled to said input gear.

3. A system according to claim 1, wherein said clutch means includes a first clutch sleeve concentric with and axially shiftable relative to said input shaft for directly drivingly connecting said input shaft to said driving shaft means, said clutch means including a second clutch sleeve concentric with and axially shiftable relative to said countershaft for permitting the countershaft to be directly drivingly connected to said first output shaft.

4. A system according to claim 3, wherein said countershaft is coaxially aligned with but relatively rotatably supported with respect to said second axle gear, and said second clutch sleeve coacting between said countershaft and said second axle gear for selectively nonrotatably connecting same together.

5. A system according to claim 4, wherein said transmission gear set includes a first transmission gear nonrotatably connected to the input shaft and disposed in continuous meshing engagement with a second transmission gear which is nonrotatably connected to said countershaft.

6. A system according to claim 1, wherein said driving shaft means includes first and second coaxially aligned and relatively rotatable driving shafts, said power divider including an interaxle differential unit having an input connection and two output connections, said input connection being drivingly connected to said first driving shaft, one of said output connections being drivingly connectable to said second driving shaft, said second driving shaft being drivingly interconnected to said second output shaft by said connecting means, and said other output connection being drivingly connected to a first axle gear as associated with said axle gear set, said first axle gear being rotatably supported on said first driving shaft, and second clutch means for selectively nonrotatably clutchably engaging said first axle gear to said first driving shaft, said second clutch means being engaged when said first-mentioned clutch means is in said second position of engagement.

7. In a geared drive system for a pair of drive axles, said system including:

multispeed auxiliary transmission means having an input shaft, a counter shaft parallel with said input shaft, a transmission gear set drivingly connectable between said input shaft and said countershaft, an intermediate shaft aligned with said input shaft and functioning as the output of said transmission means, and first clutch means for permitting said input shaft to be selectively coupled to said intermediate shaft to cause same to be directly driven from said input shaft;

interaxle differential means drivingly connected between said axles, said differential means including one input connection and two output connections, said input connection being connected to said intermediate shaft;

axle driving means drivingly connecting one of said output connections to one of said drive axles, said axle driving means including an axle gear set defined by a first axle gear rotatably and concentrically supported relative to said intermediate shaft and disposed in meshing engagement with a second axle gear nonrotatably supported on an output shaft, and second clutch means for selectively permitting said first axle gear to be nonrotatably connected to said intermediate shaft;

comprising the improvement wherein said countershaft is coaxially aligned with said second axle gear, and third clutch means associated with said auxiliary transmission means for drivingly coupling said input shaft to said second axle gear through said transmission gear set and said countershaft, whereby disengagement of said first clutch means accompanied by engagement of said second and third clutch means results in driving torque being transmitted from said input shaft through said countershaft to both said intermediate and output shafts.

8. A system according to claim 7, wherein said auxiliary transmission means includes only one said transmission gear set.

9. A system according to claim 7, wherein said countershaft is nonrotatably connected to said second axle gear, one of said transmission gears being rotatably supported on its respective shaft, and said third clutch means being associated with said one transmission gear for selectively nonrotatably coupling same to its respective shaft.

10. A system according to claim 7, wherein the transmission gear set includes an input gear rotatably supported on the input shaft, and said first and third clutch means including a common clutch sleeve nonrotatably coupled to and axially slidably supported on said input shaft, said clutch sleeve being axially shiftable between first and second positions, said clutch sleeve when in said first position being disengaged from said input gear and nonrotatably connected with said intermediate shaft, said clutch sleeve when in said second position being disengaged from said intermediate shaft and nonrotatably coupled to said input gear.

11. A system according to claim 7, wherein engagement of said second clutch means with said first axle gear for nonrotatably connecting the latter to said intermediate shaft results in said interaxle differential unit being locked up.

* * * * *